United States Patent
Miyachi et al.

(10) Patent No.: US 8,797,347 B2
(45) Date of Patent: Aug. 5, 2014

(54) IMAGE PROCESSING APPARATUS AND CONTROL METHOD THEREOF

(75) Inventors: Norihiko Miyachi, Sagamihara (JP); Osamu Sagano, Inagi (JP); Makiko Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/154,749

(22) Filed: Jun. 7, 2011

(65) Prior Publication Data

US 2011/0317072 A1     Dec. 29, 2011

(30) Foreign Application Priority Data

Jun. 28, 2010  (JP) ................................. 2010-146780

(51) Int. Cl.
  *G09G 5/00*   (2006.01)
(52) U.S. Cl.
  USPC ............ 345/617; 345/590; 382/293; 382/195
(58) Field of Classification Search
  USPC ................................... 345/617, 77
  See application file for complete search history.

(56) References Cited

U.S. PATENT DOCUMENTS

| | | | |
|---|---|---|---|
| 6,486,889 B1 * | 11/2002 | Meyers et al. | 345/604 |
| 6,873,308 B2 | 3/2005 | Sagano et al. | |
| 6,924,843 B1 | 8/2005 | Yamazaki et al. | |
| 7,057,667 B1 | 6/2006 | Mori et al. | |
| 7,148,929 B1 | 12/2006 | Mori et al. | |
| 7,154,489 B2 | 12/2006 | Abe et al. | |
| 7,242,377 B2 | 7/2007 | Mori | |
| 7,268,753 B2 * | 9/2007 | Lee et al. | 345/77 |
| 7,280,125 B2 | 10/2007 | Sagano et al. | |
| 7,446,779 B2 | 11/2008 | Ikeda et al. | |
| 7,468,639 B2 | 12/2008 | Murayama et al. | |
| 7,508,452 B2 | 3/2009 | Mori et al. | |
| 7,679,626 B2 | 3/2010 | Mori | |
| 7,817,210 B2 | 10/2010 | Ikeda et al. | |
| 2003/0152283 A1 * | 8/2003 | Moriwaki | 382/274 |
| 2011/0102479 A1 | 5/2011 | Kitada et al. | |

FOREIGN PATENT DOCUMENTS

| | | |
|---|---|---|
| JP | 2003233344 A | 8/2003 |
| JP | 2004246211 A | 9/2004 |

* cited by examiner

*Primary Examiner* — Ke Xiao
*Assistant Examiner* — F. M. Hossain
(74) *Attorney, Agent, or Firm* — Fitzpatrick, Cella, Harper & Scinto

(57) ABSTRACT

A brightness control unit includes: a "feedback brightness control unit" that calculates a first gain from a corrected image data and multiplies the first gain by image data prior to correct; and a "feedforward brightness control unit" which, when a scene change is detected, calculates a second gain on the basis of a difference between the first gain which is calculated from the corrected image data and the first gain which has been multiplied by the pre-correction image data of the corrected image data in order to correct the difference, and multiplies the second gain by the corrected image data.

8 Claims, 6 Drawing Sheets

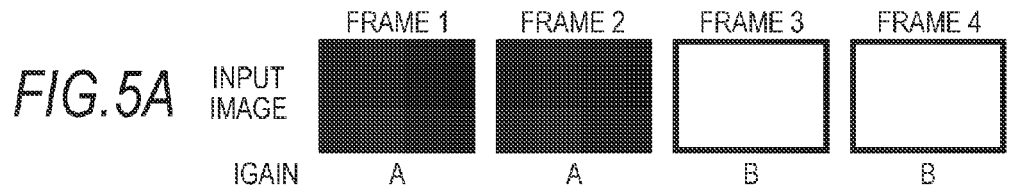
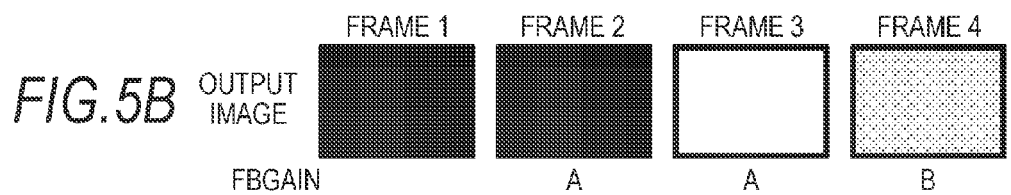
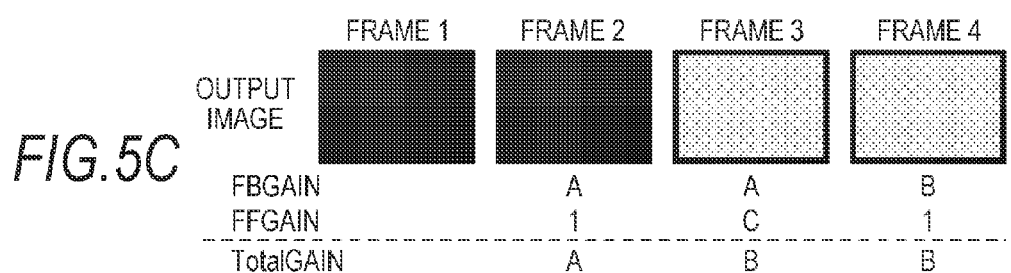
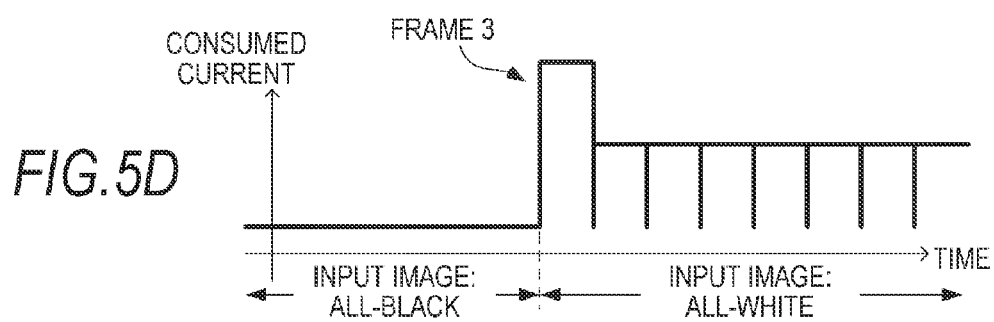
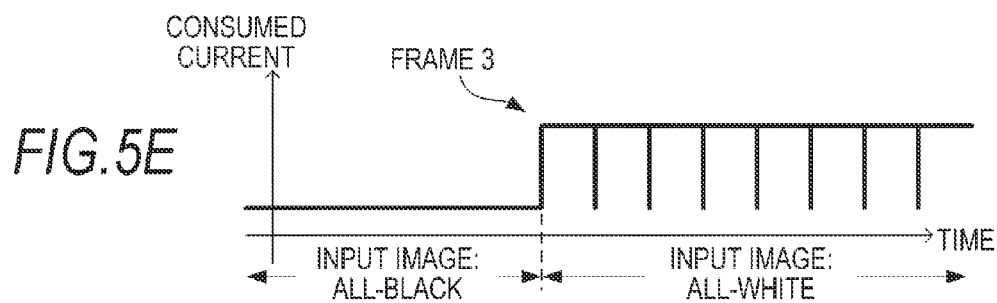

IMAGE PROCESSING APPARATUS AND CONTROL METHOD THEREOF

BACKGROUND OF THE INVENTION

1. Field of the Invention

The present invention relates to an image processing apparatus and a control method thereof, and more particularly to an image processing apparatus that dynamically controls a brightness of an image, and a control method thereof.

2. Description of the Related Art

Japanese Patent Application laid-open No. 2003-233344 discloses obtaining corrected image data by performing a correction on input image data, and controlling a display brightness by multiplying a gain by the input image data or the corrected image data. Japanese Patent Application laid-open No. 2003-233344 also discloses a brightness control circuit having a feedback configuration.

Further, Japanese Patent Application laid-open No. 2003-233344 and Japanese Patent Application laid-open No. 2004-246211 disclose a method of reducing a reaction speed of a gain variation during adaptive gain control in which a gain is calculated for each frame. In this method, the reaction speed of the gain variation is reduced by performing filter processing on the gain, and as a result, a reduction in image quality caused by gain variation is suppressed. Furthermore, Japanese Patent Application laid-open No. 2004-246211 discloses a method of increasing the reaction speed of the gain variation when a scene change is detected by modifying the filter processing performed on the gain.

FIG. 7 is a block diagram showing a brightness control circuit having a feedback configuration.

Input image data 303 are multiplied by a gain 305 to obtain brightness-controlled image data 306. The brightness-controlled image data 306 are subjected to correction processing by a correction block 302 and then output as output image data 301. The output image data 301 are input into a display panel (not shown) and a gain calculation block 304. The gain calculation block 304 determines the gain 305 on the basis of the output image data 301 for one frame. The gain 305 is then multiplied by the input image data 303 of the frame that follows the frame for which the gain 305 was determined.

An advantage of a feedback configuration is that brightness control is performed in front of the correction block 302 such that the image data corrected in the correction block 302 can be output as is to the display panel. By inputting this output into a modulation circuit, brightness control can be performed at the same time as the corrected image is displayed as is, and this is extremely favorable.

However, a disadvantage of a feedback configuration is that the image data used to determine the gain are different to the image data to be multiplied by the determined gain. This problem is known as a feedback control delay. Image data for a single frame are required to calculate the gain. Therefore, the gain is calculated after the image data for a single frame are input, or in other words at a frame changeover timing. On the other hand, gain multiplication is performed as soon as the image data are input. At this time, the gain multiplied by the input image data for an Nth frame is the gain calculated on the basis of the input image data for an N−1th frame.

When the output image is a still image or a moving image exhibiting little brightness variation, a rate of change in the determined gain is small, and therefore a feedback control delay is not greatly problematic. However, when the output image exhibits great brightness variation, for example during a still image changeover, a scene change, or the like, the rate of change in the gain increases. When the rate of change in the gain increases, effects caused by the feedback control delay may become more pronounced. For example, when a dark image is changed over to a light image, a screen appears to flash momentarily. This phenomenon will now be described using FIGS. 5A and 5B. FIG. 5A shows examples of input images and FIG. 5B shows examples of output images generated by conventional brightness control. Further, FIG. 5A shows gains (IGAIN) calculated from the respective images, while FIG. 5B shows gains (FBGAIN) that are multiplied by the respective images. FBGAIN is delayed by one frame relative to IGAIN. When a white image is input following input of consecutive black images, a gain calculated from a black image (frame 2) is multiplied by the white image (frame 3) immediately following the changeover. A value A of the gain calculated from the black image is larger than a value B of an optimum gain for the white image, and therefore the output image of frame 3 is lighter than a desired brightness. This increased brightness appears as a flash that disturbs a viewer.

Another problem arises in relation to an output capacity of a power supply. FIG. 5D shows temporal variation in a consumed current of an image display apparatus. When the output image generated by the conventional brightness control of FIG. 5B is displayed, the consumed current varies sharply at problematic frame 3. To ensure that the power supply continues to perform output with stability despite this sharp variation in the consumed current, the output capacity of the power supply must be increased. As a result, it becomes difficult to reduce the size, thickness, and cost of the image display apparatus, which is undesirable.

Note that the problems caused by the delay described above can be solved by providing a feedforward configuration in which the gain determined from the corrected image data is multiplied by the corrected image data themselves. With a feedforward configuration, however, the correction processing is implemented on the image data prior to brightness control, and the gain is multiplied by the post-correction image data. Hence, it is difficult to realize a favorable degree of correction precision. In particular, when the correction processing involves nonlinear conversion of an image data value, the correction precision deteriorates dramatically. Therefore, in terms of image quality, brightness control employing a feedback configuration is preferable to brightness control employing a feedforward configuration.

SUMMARY OF THE INVENTION

The present invention has been designed in consideration of the circumstances described above, and an object thereof is to provide a technique employed in an image processing apparatus for controlling the brightness of pre-correction image data using a gain determined from post-correction image data, in which brightness control is performed appropriately even when the brightness varies greatly between frames, so that a high quality image is output.

The present invention in its first aspect provides an image processing apparatus that inputs image data and displays an image based on the image data on a display unit, including: a correction unit that corrects image data for each frame with a correction corresponding to a value of the image data, and outputs corrected image data; a brightness control unit that controls an overall brightness of the image; and a detection unit that detects a scene change in the image, wherein the brightness control unit includes: a first brightness control unit that calculates a first gain from the corrected image data and multiplies the first gain by image data prior to input into the correction unit; and a second brightness control unit which, when a scene change is detected by the detection unit, calculates a second gain on the basis of a difference between the first gain which is calculated from the corrected image data and the first gain which has been multiplied by the pre-correction image data of the corrected image data in order to correct the difference, and multiplies the second gain by the corrected image data.

The present invention in its second aspect provides a control method for an image processing apparatus that inputs image data and displays an image based on the image data on a display unit, including the steps of: correcting image data for each frame with a correction corresponding to a value of the image data and outputting corrected image data; controlling an overall brightness of the image; and detecting a scene change in the image, wherein the step of controlling the brightness includes: a first brightness control step of calculating a first gain from the corrected image data and multiplying the first gain by image data prior to correction; and a second brightness control step of, when a scene change is detected, calculating a second gain on the basis of a difference between the first gain which is calculated from the corrected image data and the first gain which has been multiplied by the pre-correction image data of the corrected image data in order to correct the difference, and multiplying the second gain by the corrected image data.

According to the present invention, brightness control can be performed appropriately in an image processing apparatus for controlling the brightness of pre-correction image data using a gain determined from post-correction image data, even when the brightness varies greatly between frames, and as a result, a high quality image can be output.

Further features of the present invention will become apparent from the following description of exemplary embodiments with reference to the attached drawings.

BRIEF DESCRIPTION OF THE DRAWINGS

FIGS. 5A to 5E are views illustrating problems inherent in conventional brightness control and effects of brightness control according to an embodiment of the present invention;

DESCRIPTION OF THE EMBODIMENTS

The present invention relates to an image processing apparatus for dynamically (adaptively) controlling a display brightness in accordance with a value of image data for each frame, and a control method thereof. The present invention may be applied to an image display apparatus (for example, a television apparatus, a computer monitor, or an advertising display), or to an apparatus (for example, a video reproduction apparatus or a computer) that supplies a video signal to an image display apparatus. Embodiments of the present invention will be described below citing, as an example, an image display apparatus employing a display element constituted by a cold cathode device (electron emitting device), such as a surface conduction electron emitter, and a fluorescent material.

First Embodiment

Figure 2:
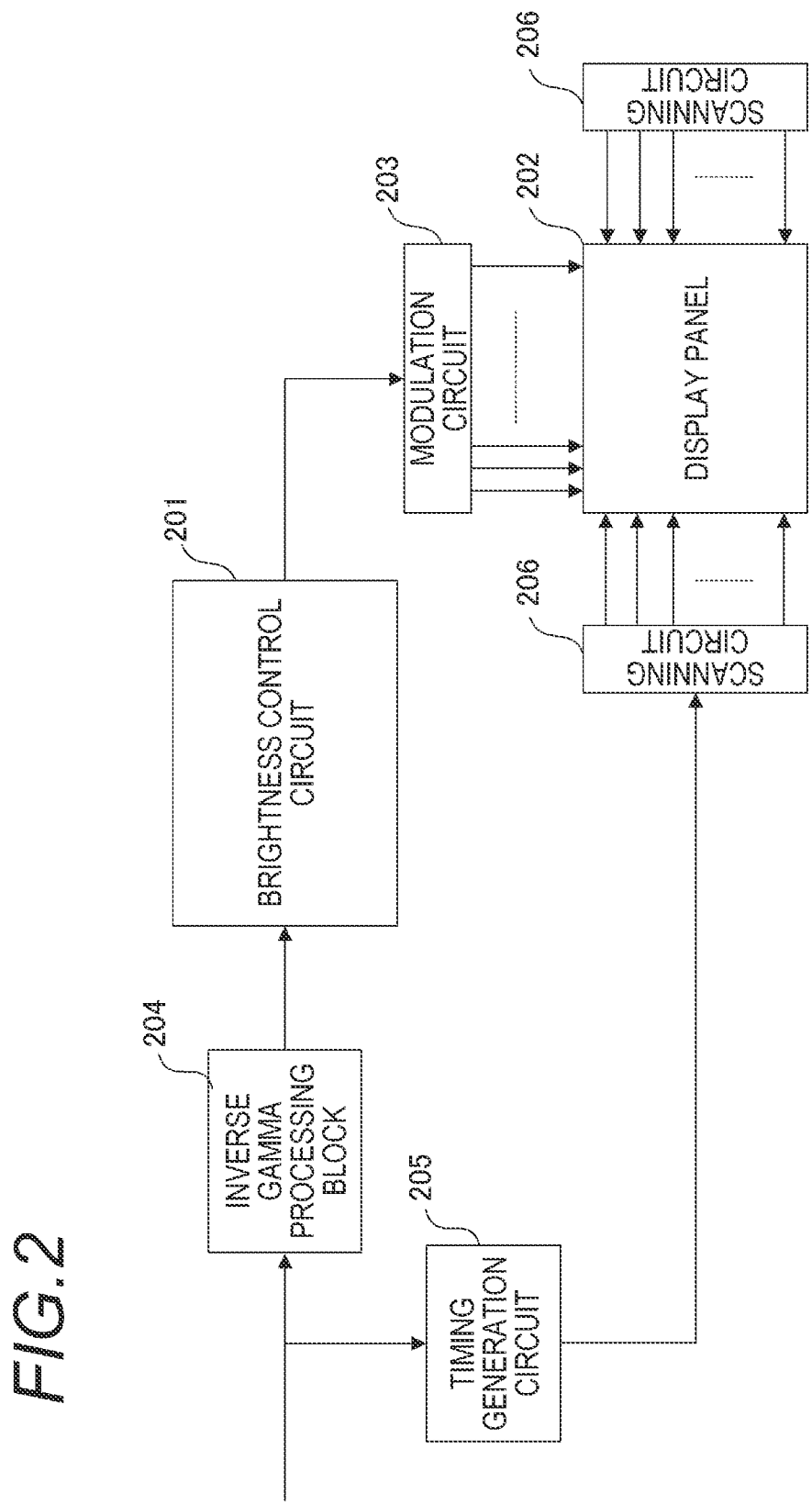
FIG. 2 is a block diagram showing the constitution of an image display apparatus according to an embodiment of the present invention.

FIG. 2 is a block diagram showing the constitution of the image display apparatus.

Figure 3:
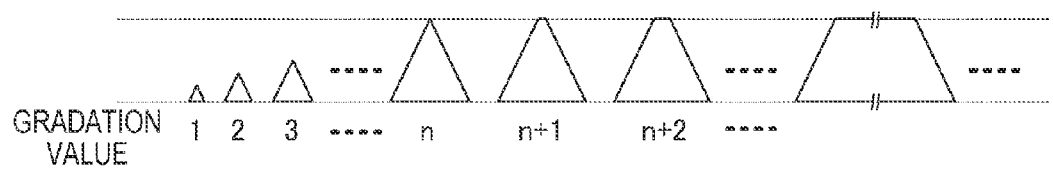
FIG. 3 is a view showing a waveform of a drive pulse output from a modulation circuit shown in FIG. 2.

The image display apparatus mainly includes a display unit (a display panel 202, a modulation circuit 203, a scanning circuit 206), and an image processing unit (an inverse gamma processing block 204, a brightness control circuit 201). An input signal, an Hsync (horizontal synchronization) signal, and a Vsync (vertical synchronization) signal are input into the image processing unit. The inverse gamma processing block 204 performs inverse gamma processing on the input signal, and outputs image data. The image data have a linear value in relation to brightness. The brightness control circuit 201 performs processing to control the image data input from the inverse gamma processing block 204 to output image data that conform to a characteristic of the display unit. The modulation circuit 203 generates drive pulses on the basis of the output image data, and outputs the drive pulses to respective column wirings of the display panel 202. A timing generation circuit 205 outputs a scanning signal on the basis of the Hsync signal and the Vsync signal. The scanning circuit 206 outputs a selection signal in sequence to row wirings of the display panel 202 on the basis of the scanning signal. Electrons are emitted from the cold cathode device in accordance with a potential difference between the drive pulse and the selection signal, and as a result, the fluorescent material emits light such that an image is displayed. The modulation circuit 203 may use any modulation system, such as pulse width modulation, pulse amplitude modulation, or a combination of pulse width modulation and pulse amplitude modulation. In this embodiment, a drive pulse having a waveform such as that shown in FIG. 3 is used. Specifically, in a low brightness region (gradation value=1 to n), a triangular waveform is gradually increased in accordance with the gradation value, and in a medium to high brightness region (gradation value>n), a pulse width of a trapezoidal waveform is gradually expanded in accordance with the gradation value. Thus, an improvement in reproducibility can be achieved in the low brightness region.

(Brightness Control Circuit)

Figure 1:
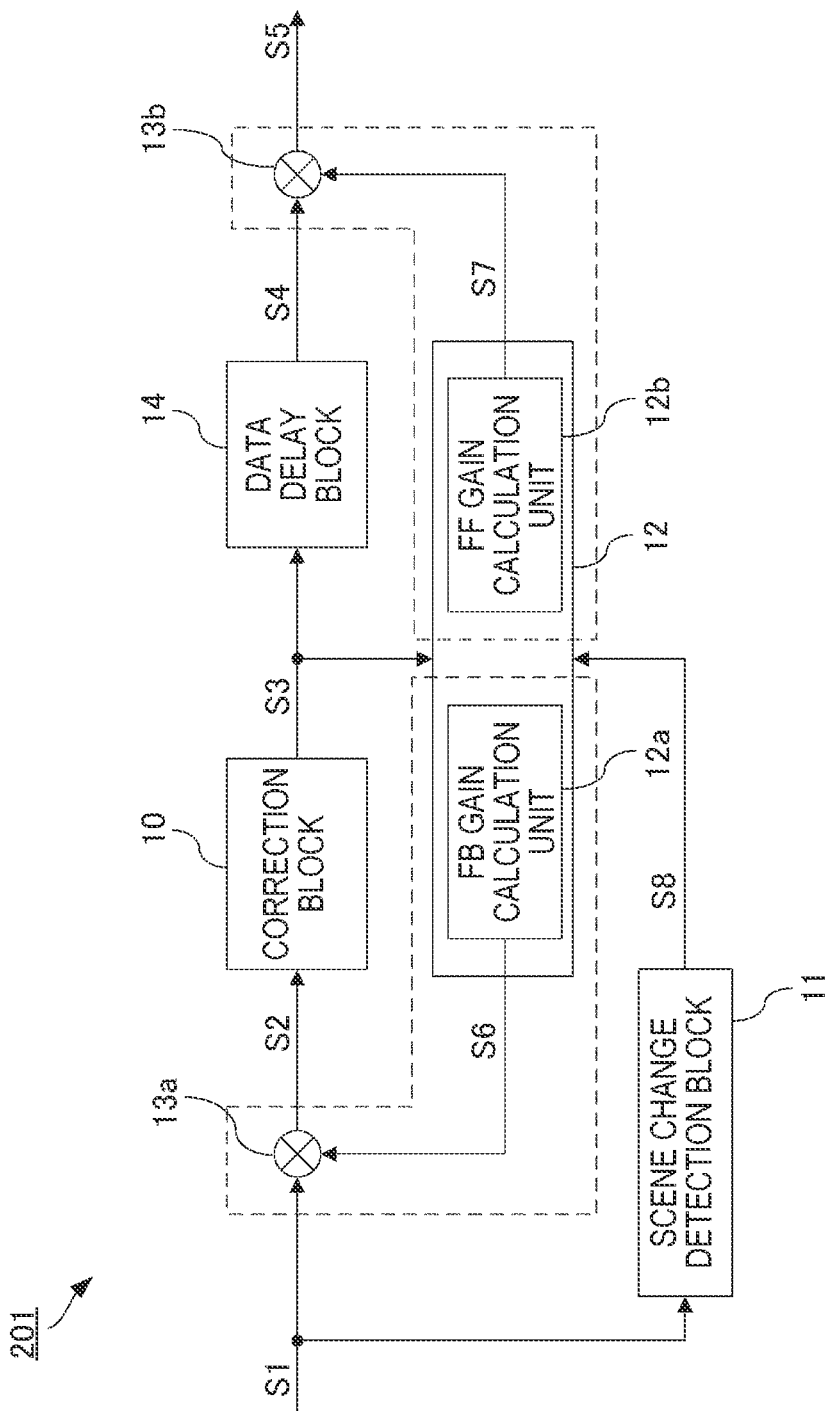
FIG. 1 is a block diagram showing the constitution of a brightness control circuit according to an embodiment of the present invention.

FIG. 1 shows the constitution of the brightness control circuit 201. In the brightness control circuit 201 according to this embodiment, brightness control through feedback (FB) and brightness control through feedforward (FF) are combined in accordance with a scene change of images.

The brightness control circuit 201 includes a correction block 10 serving as a correction unit, a scene change detection block 11 serving as a detection unit, a gain calculation unit 12 and multipliers 13a, 13b constituting a brightness control unit, and a data delay block 14. The gain calculation unit 12 includes an FB gain calculation unit 12a for calculating an FB gain (a first gain) and an FF gain calculation unit 12b for calculating an FF gain (a second gain). Hereafter, the FB gain calculation unit 12a and the multiplier 13a will be referred to together as an "FB control block", while the FF gain calculation unit 12b and the multiplier 13b will be referred to together as an "FF control block". In this embodiment, the FB control block and the FF control block correspond respectively to a first brightness control unit and a second brightness control unit of the present invention.

Input image data S1 are input into the FB control block, multiplied by an FB gain S6 in the multiplier 13a, and then output as FB-controlled data S2. The FB-controlled data S2 are input into the correction block 10, subjected to correction processing, and then output as corrected image data S3. The corrected image data S3 are input into the data delay block 14, delayed by one frame, and output as delayed corrected image data S4. The delayed corrected image data S4 are input into the FF control block, multiplied by an FF gain S7 in the multiplier 13b, and then output as output image data S5. The output image data S5 are input into the modulation circuit 203 (see FIG. 2) of the display unit and used as driving data of the modulation circuit 203.

The input image data S1 are also input into the scene change detection block 11. The scene change detection block 11 analyzes the input image data S1 to detect a scene change in images, and outputs a scene change signal S8 indicating the presence or absence of a scene change. A scene change will be described below.

The corrected image data S3 are input into the gain calculation unit 12. The FB gain calculation unit 12a calculates the FB gain S6 from the corrected image data S3. The FB gain S6 is multiplied by the image data S1 of a following frame in the multiplier 13a. Further, the FB gain S6 is held in the gain calculation unit 12 temporarily and used by the FF gain calculation unit 12b to calculate the FF gain. The FF gain calculation unit 12b calculates the FF gain S7 on the basis of the FB gain calculated from the corrected image data S3, the FB gain which has been actually multiplied by the pre-correction image data of the corrected image data S3, and the scene change signal S8.

(FB Control Block)

The FB control block is constituted by the FB gain calculation unit 12a and the multiplier 13a. An operation of the FB control block will now be described.

The FB gain calculation unit 12a determines the FB gain using the corrected image data S3 for one frame, output from the correction block 10. The FB gain is multiplied by the image data for one frame uniformly in order to control the overall brightness of the image.

Various gain calculation methods may be employed, depending on the aim of the brightness control, a target brightness, and so on. For example, the FB gain calculation unit 12a may detect a maximum value of the corrected image data for one frame and set a value obtained by dividing an upper limit value of the data that can be input into the display unit by the detected maximum value as the FB gain. With this method, a high-brightness display image making maximum use of a dynamic range of the display unit can be obtained. Note that when a dark image becomes extremely light, a light-dark balance of the image may be lost, and as a result, a viewer may be disturbed. It is therefore preferable to impose an upper limit (2.0, for example) on the value of the gain. In another method, the FB gain calculation unit 12a may calculate an average picture level (APL) from the corrected image data for one frame, and the value of the gain may be set such that the APL value is held within a desired range.

The multiplier 13a multiplies the FB gain S6 calculated in the FB gain calculation unit 12a by the image data S1 prior to input into the correction block 10. In this feedback control, a problem arises in that the gain is multiplied not by the corrected image data used to calculate the gain but by the image data of the following frame. This type of situation, in which the gain is multiplied by the image data of the following frame, is known as a feedback control delay.

(Correction Block)

The correction block 10 performs at least one type of correction processing on the FB-controlled data S2, and outputs the corrected image data S3.

Figure 4A:
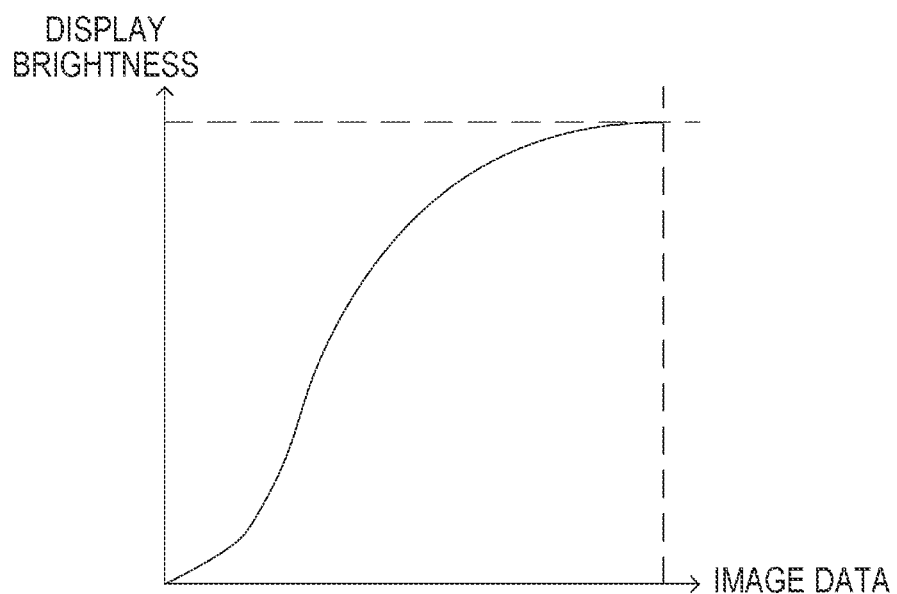
FIG. 4A is a view showing a relationship between pre-correction image data and a display brightness.
Figure 4B:
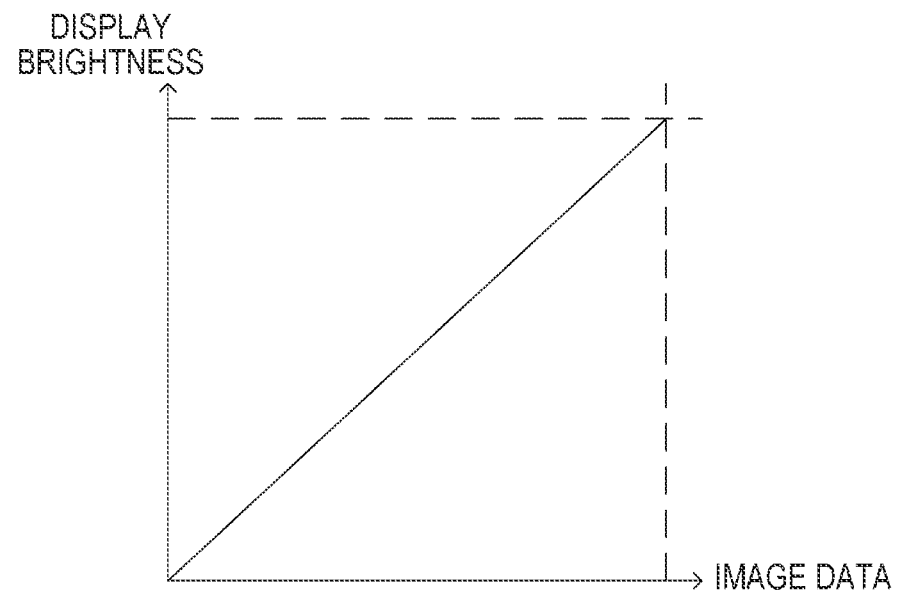
FIG. 4B is a view showing a relationship between post-correction image data and the display brightness.

In the image display apparatus employing a surface conduction electron emitter according to this embodiment, a large number of display elements are formed on a substrate of the display panel 202. Each display element includes fluorescent material. As shown in FIG. 4A, the fluorescent material has a nonlinear characteristic whereby the brightness is saturated relative to the input image data. This saturation characteristic differs according to the color of the fluorescent material. The relationship between the input image data and the display brightness must be made linear in order to reproduce the image intended by the input image data. Hence, the correction block 10 preferably performs a correction for making the relationship between the image data and the brightness linear, as shown in FIG. 4B. Further, in the image display apparatus according to this embodiment, brightness unevenness (spatial unevenness in the brightness) may occur due to variation in an electron emission characteristic of the respective elements and a voltage drop caused by wiring resistance. Hence, the correction block 10 preferably corrects this type of brightness unevenness on the basis of an element position and the image data.

The correction processing performed by the correction block 10 differs from the processing for multiplying the gain uniformly during the brightness control in that a correction amount (a correction coefficient) may vary according to the value of the image data. In other words, the correction processing performed by the correction block 10 is conversion processing having an output characteristic nonlinear with respect to the value of the image data. When both brightness control processing and nonlinear correction processing are performed, as in this embodiment, the brightness control is preferably performed before the correction. Moreover, in order to obtain an optimum gain, the gain is preferably calculated from the post-correction image data. The correction processing performed by the correction block 10 is not limited to correction processing relating to the saturation characteristic of the fluorescent material or correction processing relating to a voltage drop, as described above. For example, correction processing for obtaining an appropriate contrast or color reproduction according to the image data, such as dynamic gamma correction processing or dynamic color correction processing may also be performed.

(Data Delay Block)

The data delay block 14 holds the corrected image data S3 for one frame for a single frame period and then outputs the data as the delayed corrected image data S4. In this embodiment, the data are held for a single frame period, but the data holding time is not limited thereto and may be set appropriately in accordance with a time required to calculate the FF gain.

(Scene Change Detection Block)

The scene change detection block 11 calculates a statistic of the value of the input image data 51 for each frame, and detects a scene change in images on the basis of a difference in the statistic between frames. Here, a large variation in brightness between two frames output consecutively is taken as a scene change. The scene change detection block 11 outputs the scene change signal S8 indicating the presence or absence of a scene change for each frame.

For example, the scene change detection block 11 calculates the APL from the input image data 51 of a certain frame, compares the calculated APL with the APL of an immediately preceding frame, and outputs a scene change signal S8 indicating that a scene change has occurred when a rate of change of the APL equals or exceeds a predetermined threshold. When the rate of change of the APL is smaller than the threshold, the scene change detection block 11 outputs a scene change signal S8 indicating that a scene change has not occurred.

The scene change detection method used by the scene change detection block 11 is not limited to the method described above, and a scene change may be detected using a statistic (a maximum value, a minimum value, a variance, a standard deviation, a histogram, and so on) other than the APL. In a method using a histogram, for example, a histogram representing a brightness distribution is calculated from the input image data for one frame and compared with the histogram of the immediately preceding frame. When at least a predetermined change has occurred in the distribution, it is determined that a scene change has occurred.

(FF Control Block)

The FF control block is constituted by the FF gain calculation unit 12b and the multiplier 13b. An operation of the FF control block will now be described.

The FF gain calculation unit 12b calculates the FF gain S7 on the basis of the FB gain calculated from the corrected image data S3, the FB gain which has been actually multiplied by the pre-correction image data of the corrected image data S3, and the scene change signal S8.

Since a delay exists in the feedback control, the FB gain (an ideal gain) calculated from the corrected image data S3 may not match the FB gain (an actual gain) which has been actually multiplied by the pre-correction image data of the corrected image data S3. When a scene change occurs, the brightness changes particularly greatly before and after the scene change, and as a result, the difference (error) between the ideal gain and the actual gain tends to increase.

Hence, the FF gain calculation unit 12b uses the scene change signal S8 to determine whether or not a scene change has occurred between the frame of the corrected image data S3 and the previous frame thereto. When a scene change has occurred, the FF gain calculation unit 12b calculates an FF gain for correcting the difference between the ideal gain and the actual gain on the basis of this difference, and outputs the calculated FF gain to the multiplier 13b. For example, a value obtained by dividing the value of the ideal gain by the value of the actual gain may be used as the FF gain. Note that the ideal gain is the FB gain calculated from the corrected image data of a current frame, while the actual gain is the FB gain calculated from the corrected image data of the immediately preceding frame. Both gains may be obtained from the FB gain calculation unit 12a. When a scene change has not occurred, on the other hand, brightness control using the FF gain is not required, and therefore the FF gain calculation unit 12b outputs an FF gain of 1.

The FF gain S7 is multiplied uniformly by the delayed corrected image data S4 in the multiplier 13b. Note that in this embodiment, an FF gain of 1 is multiplied when a scene change has not occurred. However, an identical effect is obtained with a constitution in which the delayed corrected image data S4 are output as is, i.e. bypassing the multiplier 13b, when a scene change has not occurred.

FIGS. 5A and 5C show examples of input images and output images of the brightness control circuit according to this embodiment. Note that in order to facilitate description of the advantages of the brightness control according to this embodiment, the correction processing will be ignored.

IGAIN in FIG. 5A denotes the value of the ideal gain calculated from the image data. In black images of frames 1 and 2, IGAIN=A, and in white images of frames 3 and 4, IGAIN=B, wherein A>B.

FBGAIN in FIG. 5C represents the actual FB gain which has been multiplied by the image data. FBGAIN is delayed by one frame relative to IGAIN. FFGAIN in FIG. 5C represents the FF gain that is multiplied by the image data. A scene change does not occur in frame 2 and frame 4, and therefore the value of FFGAIN is 1. A scene change is determined to be present in frame 3, and therefore an FFGAIN value C is calculated on the basis of an IGAIN value B and an FBGAIN value A of frame 3. Here, FFGAIN is determined by dividing IGAIN by FBGAIN such that C=B/A.

TotalGAIN in FIG. 5C represents a total (a product) of the gain that is multiplied by the input image. In other words, TotalGAIN=FBGAIN×FFGAIN. Ideally, TotalGAIN matches the value of the ideal gain IGAIN calculated from the input image. In frame 3, where a scene change occurs, TotalGAIN=A×C=A×(B/A)=B=IGAIN, and therefore appropriate brightness control can be realized on a frame including a scene change.

Hence, even when an image exhibiting great brightness variation is input, for example when an all-white image follows consecutive all-black images, as shown in FIG. 5A, the phenomenon of FIG. 5B can be avoided, and therefore the image can be displayed at an appropriate brightness corresponding to the scene change, as shown in FIG. 5C. FIG. 5E is a view showing temporal variation in a consumed current of the image display apparatus during output of the images shown in FIG. 5C. With the brightness control according to this embodiment, dramatic variation in a consumed power can be suppressed, and therefore a load on a power supply circuit and the like can be lightened. As a result, reductions can be achieved in the size, thickness, and cost of the image display apparatus.

As described above, with the constitution of this embodiment, brightness control is performed favorably through feedback control while performing correction processing when a scene change is not detected. When a scene change is detected, feedforward control is performed in conjunction with the feedback control to compensate for the error generated in the gain due to the delay in the feedback control. The feedback control delay that occurs during a scene change is thus substantially eliminated, and therefore, with the constitution of this embodiment, brightness control can be performed appropriately even when the brightness varies greatly between frames. As a result, a high quality image can be output. With the constitution of this embodiment, particularly favorable effects can be expected in a case requiring both brightness control and nonlinear correction processing, in which the correction amount differs according to the value of the image data.

Note that the FB gain calculation unit 12a and the FF gain calculation unit 12b may be constituted by a single block, as in this embodiment, or by separate blocks. However, the units 12a and 12b are preferably constituted by a single block to achieve a reduction in circuit scale. Further, in this embodiment, the FB gain calculated by the FB gain calculation unit 12a is used to calculate the FF gain, but the FF gain calculation unit 12b itself may calculate the FB gain for each frame from the corrected image data.

Second Embodiment

In this embodiment, the brightness control circuit according to the first embodiment is combined with a function for performing filter processing to reduce gain variation between frames.

Figure 6:
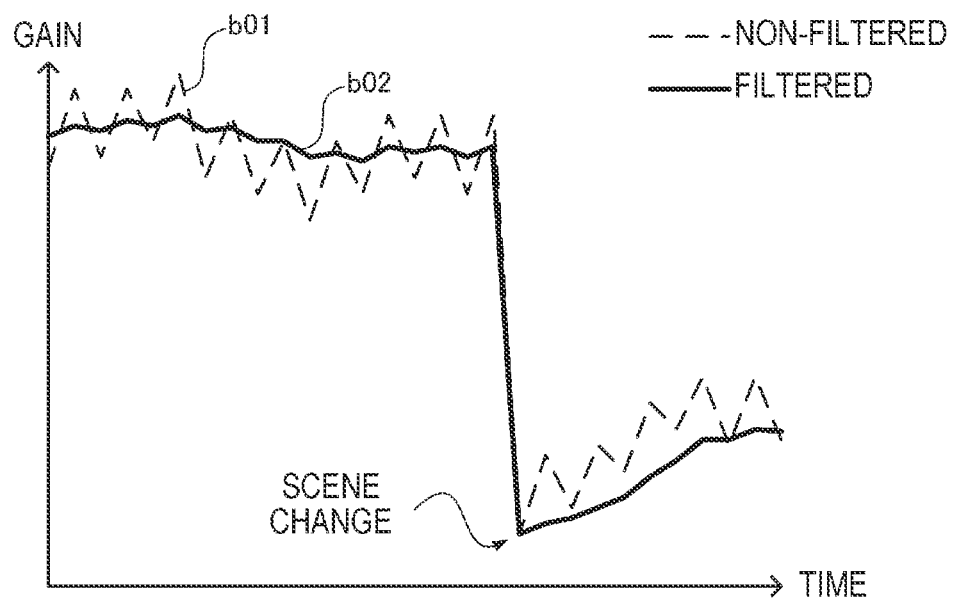
FIG. 6 is a view illustrating effects of filter processing according to a second embodiment of the present invention.
Figure 7:
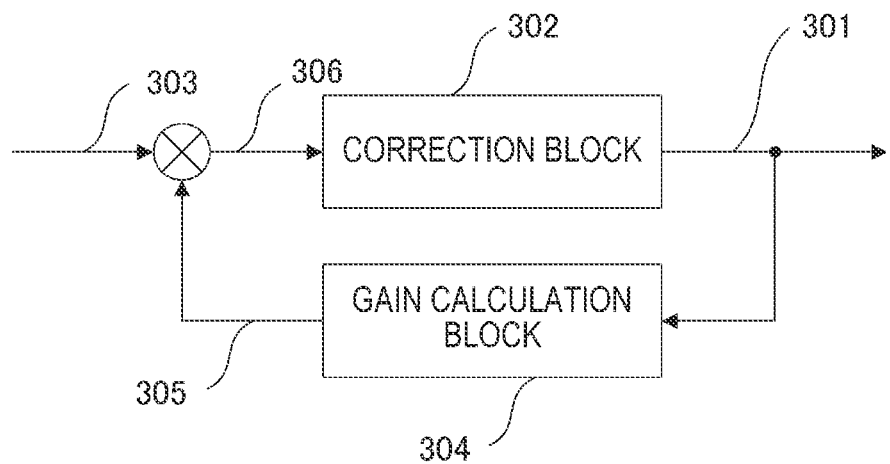
FIG. 7 is a block diagram showing the constitution of a conventional brightness control circuit.

With the constitution of the first embodiment, it is possible to suppress a phenomenon whereby the screen appears to flash momentarily during a scene change. However, when a scene change does not occur, the displayed image may appear to flicker due to fine oscillation in the value of the FB gain. A dotted line b01 in FIG. 6 shows an example of variation in the FB gain when filtering is not performed. This flickering tends to be particularly striking when the non-linearity of the correction processing performed in the correction block 10 (see FIG. 1) is high. Hence, in this embodiment, a special filter for suppressing variation in the FB gain is added to the FB control block.

A brightness control circuit according to this embodiment will now be described using FIG. 1. In this embodiment, the FB gain calculation unit 12a includes a low pass filter. After calculating the gain from the corrected image data S3, the FB gain calculation unit 12a implements filter processing on the gain and outputs a filtered value as the FB gain S6. Note, however, that when a scene change is determined to be present from the scene change signal S8, the FB gain calculation unit 12a outputs the gain calculated from the corrected image data S3 as is as the FB gain S6 without performing the filter processing.

For example, the FB gain output when a scene change has not occurred is calculated as $$Gout(N)=Gout(N-1)+\{Gnew(N)-Gout(N-1)\}/F,$$

while the FB gain output when a scene change has occurred is calculated as $$Gout(N)=Gnew(N),$$

where

Gout(N) is the FB gain output for an Nth frame,
Gnew(N) is the FB gain calculated in the Nth frame, and
F is a filter coefficient (F>1).

A gain variation reduction effect increases steadily as the value of the filter coefficient F increases beyond 1.

According to this embodiment, gain variation can be reduced, as shown by a solid line b02 in FIG. 6. As a result, a situation in which gain variation appears as flickering can be prevented from occurring.

The feedback control delay occurs likewise in the FB control block according to this embodiment. The reason for this is that the FB gain subjected to the filter processing is applied at a delay of one frame, as described in the first embodiment. Hence, in this embodiment also, the FF gain calculation unit 12b performs feedforward control by calculating the FF gain from the ideal gain (Gout(N)) and the actual gain (Gout(N−1)) when a scene change occurs, and as a result, an identical effect to the first embodiment can be obtained. Further, when a scene change does not occur, apparent flickering caused by gain variation can be reduced in comparison with the first embodiment, and therefore image output can be performed even more favorably.

Third Embodiment

A single image may be constituted by image data for a plurality of frames. For example, a 3D image (stereoscopic image) is constituted by two sets of image data for a right eye and a left eye, an HDR (High Dynamic Range) image is constituted by a plurality of sets of image data having different exposures, and so on. If the processing method according to the first embodiment, in which the FB gain and the FF gain are calculated and multiplied for each frame, is employed when this type of image is input, differences may occur in a brightness magnification ratio among a group of frames constituting a single image. When variation exists in the brightness magnification ratio, the viewer may be disturbed. Moreover, it may be impossible to reproduce the intended image.

Hence, in this embodiment, when a signal in which a single image is constituted by image data for a plurality of frames is input, information indicating a number of consecutive frames is provided to the brightness control circuit 201. The number of consecutive frames is the number of frames in the group of frames constituting the single image, for example two in the case of a 3D image. Note that the information indicating the number of consecutive frames may be provided together with the input signal or detected by analyzing the input signal.

In the brightness control circuit 201 (see FIG. 1) according to this embodiment, the FB gain calculation unit 12a calculates the FB gain only once within a period of the number of consecutive frames and the FF gain calculation unit 12b calculates the FF gain only once within the period of the number of consecutive frames. Further, the scene change detection block 11 performs scene change detection only once within the period of the number of consecutive frames. In other words, a gain having an unchanging value is output continuously from the gain calculation unit 12 during processing of the image data for the group of frames constituting the single image.

With the constitution described above, the gain having an unchanging value can be multiplied by the image data for the group of frames. Hence, brightness control can be performed appropriately even on a single image constituted by image data relating to a plurality of frames, such as a stereoscopic image or an HDR image. As a result, high quality image display can be performed without disturbing the viewer.

Fourth Embodiment

A human eye is likely to experience discomfort from the glare produced by a momentary light image but unlikely to experience discomfort from a momentary dark image. Moreover, the eye is steadily less likely to experience discomfort as a display period of a dark image decreases. In this embodiment, the term "momentary" denotes a period lasting between one frame and several frames.

Hence, the problematic display brightness caused by the feedback control delay is pronounced when the brightness changes from a dark image to a light image, but substantially invisible when the brightness changes from a light image to a dark image.

Therefore, the FF gain calculation unit 12b according to this embodiment determines whether a scene change has occurred from a dark image to a light image or from a light image to a dark image, outputs an FF gain calculated using an identical method to the first embodiment in the former case, and outputs a gain of 1 in the latter case.

During a changeover from a dark image to a light image, the actual gain is larger than the ideal gain, and therefore the value of the gain calculated by the FF gain calculation unit 12b is smaller than 1. During a changeover from a light image to a dark image, on the other hand, the value of the gain calculated by the FF gain calculation unit 12b is larger than 1. Hence, by determining whether or not the value of the calculated gain is smaller than 1, the FF gain calculation unit 12b can switch between outputting the calculated gain and outputting the gain of 1. Alternatively, similar processing may be realized by adding a limiter for limiting the value of the FF gain to a value no larger than 1 to the FF gain calculation unit 12b.

A feature of this embodiment is that feedforward control following detection of a scene change is performed only during a changeover from a dark image to a light image. According to this embodiment, discomfort caused by a momentary increase in brightness during a scene change from a dark image to a light image can be prevented. During a scene change from a light image to a dark image, on the other hand, the corrected image data output from the correction block 10 are output as is, and therefore a clear, high quality image is displayed.

In another constitution, the scene change detection block 11 may determine whether a changeover has occurred from a light image to a dark image or from a dark image to a light image and output a scene change signal indicating that a scene change has occurred only when a changeover has occurred from a dark image to a light image. An identical effect to that of this embodiment can be obtained likewise with this method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-146780, filed on Jun. 28, 2010, which is hereby incorporated by reference herein in its entirety.

What is claimed is:

1. An image processing apparatus that inputs video image data of a plurality of frames and displays a plurality of images comprising a plurality of frames based on the video image data on a display unit, the image processing apparatus comprising:
   a correction unit that corrects image data for each frame of the plurality of frames with a correction amount corresponding to a value of the image data, and that outputs corrected image data for each frame;
   a brightness control unit that controls an overall brightness of image data for each frame of the plurality of frames; and
   a detection unit that detects a scene change between one of the images and the next image in the plurality of images comprising the plurality of frames,
   wherein the brightness control unit includes:
   (a) a first brightness control unit that calculates a first gain from the corrected image data of a frame and multiplies the first gain by image data of a following frame prior to input into the correction unit; and
   (b) a second brightness control unit which, when a scene change is detected by the detection unit, calculates a second gain on the basis of a difference between (i) the first gain which is calculated from the corrected image data of a current frame and (ii) the first gain which has been calculated from the corrected image data of a preceding frame, and multiplies the second gain by the corrected image data of the current frame, and which, when a scene change is not detected by the detection unit, multiplies a gain of 1 by the corrected image data of the current frame or bypasses the multiplication of the second gain.

2. The image processing apparatus according to claim 1, wherein the second brightness control unit calculates the second gain by dividing a value of the first gain which is calculated from the corrected image data of the current frame, by a value of the first gain which has been calculated from the corrected image data of the preceding frame.

3. The image processing apparatus according to claim 1, wherein the second brightness control unit multiplies the second gain by the corrected image data only when a value of the second gain is smaller than 1.

4. The image processing apparatus according to claim 1, wherein the correction unit performs a correction having an output characteristic nonlinear with respect to the value of the image data to be input.

5. The image processing apparatus according to claim 1, wherein when a single image is constituted by image data for a plurality of frames, the brightness control unit multiplies a first gain having an unchanging value by the image data for the plurality of frames constituting the single image.

6. The image processing apparatus according to claim 1, wherein the detection unit calculates a statistic of the value of the image data for each frame, and detects a scene change on the basis of a difference in the statistic between frames.

7. The image processing apparatus according to claim 1, wherein the first brightness control unit has a function for performing filter processing on the first gain calculated from the corrected image data in order to suppress variation in the first gain between frames, and
   wherein the first brightness control unit does not perform the filter processing when a scene change is detected by the detection unit.

8. A control method for an image processing apparatus that inputs video image data of a plurality of frames and displays a plurality of images comprising a plurality of frames based on the video image data on a display unit, the control method comprising the steps of:
   correcting image data for each frame of the plurality of frames with a correction amount corresponding to a value of the image data and outputting corrected image data for each frame;
   controlling an overall brightness of image data for each frame of the plurality of frames; and
   detecting a scene change between one of the images and the next image in the plurality of images comprising the plurality of frames,
   wherein the step of controlling the brightness includes:
   (a) a first brightness control step of calculating a first gain from the corrected image data of a frame and multiplying the first gain by image data of a following frame prior to correction; and
   (b) a second brightness control step of, (1) when a scene change is detected, calculating a second gain on the basis of a difference between (i) the first gain which is calculated from the corrected image data of a current frame and (ii) the first gain which has been calculated from the corrected image data of a preceding frame, and multiplying the second gain by the corrected image data of the current frame, and (2) when a scene change is not detected, multiplying a gain of 1 by the corrected image data of the current frame or bypassing the multiplication of the second gain.

* * * * *